(12) United States Patent
Cricri et al.

(10) Patent No.: US 10,831,443 B2
(45) Date of Patent: Nov. 10, 2020

(54) CONTENT DISCOVERY

(71) Applicant: Nokia Technologies Oy, Espoo (FI)

(72) Inventors: Francesco Cricri, Tampere (FI); Arto Lehtiniemi, Lampäälä (FI); Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/326,306

(22) PCT Filed: Aug. 22, 2017

(86) PCT No.: PCT/FI2017/050584
§ 371 (c)(1),
(2) Date: Feb. 18, 2019

(87) PCT Pub. No.: WO2018/037157
PCT Pub. Date: Mar. 1, 2018

(65) Prior Publication Data
US 2019/0187954 A1   Jun. 20, 2019

(30) Foreign Application Priority Data
Aug. 26, 2016   (EP) .................................... 16186034

(51) Int. Cl.
*G06F 3/16*   (2006.01)
*G06F 3/01*   (2006.01)
(52) U.S. Cl.
CPC .............. *G06F 3/167* (2013.01); *G06F 3/011* (2013.01); *G06F 3/013* (2013.01)
(58) Field of Classification Search
CPC .......... G06F 3/167; G06F 3/011; G06F 3/013; G06F 3/1423; G09G 5/12; G06T 19/006; H04N 21/4122
See application file for complete search history.

(56) References Cited

U.S. PATENT DOCUMENTS

2003/0160862 A1* 8/2003 Charlier ............. H04N 5/23238
                                                             348/14.08
2012/0163606 A1* 6/2012 Eronen ................... H04S 7/302
                                                             381/22
(Continued)

FOREIGN PATENT DOCUMENTS

EP   3109733 A1   12/2016

OTHER PUBLICATIONS

Extended European Search Report received for corresponding European Patent Application No. 16186034.1, dated Nov. 4, 2016, 7 pages.
(Continued)

*Primary Examiner* — Tadesse Hailu
(74) *Attorney, Agent, or Firm* — Alston & Bird LLP

(57) ABSTRACT

A method, apparatus and computer program code is provided. The method comprises: causing display of a virtual object at a first position in virtual space, the virtual object having a visual position and an aural position at the first position; processing positional audio data based on the aural position of the virtual object being at the first position; causing positional audio to be output to a user based on the processed positional audio data; changing the aural position of the virtual object from the first position to a second position in the virtual space, while maintaining the visual position of the virtual object at the first position; further processing positional audio data based on the aural position of the virtual object being at the second position; and causing positional audio to be output to the user based on the further processed positional audio data, while maintaining the visual position of the virtual object at the first position.

16 Claims, 8 Drawing Sheets

(56) References Cited

U.S. PATENT DOCUMENTS

| | | | | |
|---|---|---|---|---|
| 2013/0083064 | A1* | 4/2013 | Geisner | G06F 3/011 |
| | | | | 345/633 |
| 2013/0232430 | A1* | 9/2013 | Reitan | G06F 3/0484 |
| | | | | 715/765 |
| 2013/0315404 | A1* | 11/2013 | Goldfeder | H04R 3/005 |
| | | | | 381/58 |
| 2014/0006026 | A1* | 1/2014 | Lamb | G10L 17/00 |
| | | | | 704/246 |
| 2014/0362253 | A1* | 12/2014 | Kim | H04R 3/005 |
| | | | | 348/231.4 |
| 2014/0369506 | A1* | 12/2014 | Arrasvuori | G01S 3/8083 |
| | | | | 381/17 |
| 2014/0375683 | A1* | 12/2014 | Salter | G06F 3/013 |
| | | | | 345/633 |
| 2015/0302662 | A1* | 10/2015 | Miller | G06F 3/011 |
| | | | | 345/633 |
| 2016/0131912 | A1* | 5/2016 | Border | G02B 27/0075 |
| | | | | 345/8 |
| 2016/0133051 | A1* | 5/2016 | Aonuma | G06T 19/006 |
| | | | | 345/633 |
| 2016/0212538 | A1* | 7/2016 | Fullam | H04R 29/001 |
| 2016/0370858 | A1 | 12/2016 | Leppanen et al. | |

OTHER PUBLICATIONS

International Search Report and Written Opinion received for corresponding Patent Cooperation Treaty Application No. PCT/FI2017/050584, dated Sep. 19, 2017, 11 pages.

\* cited by examiner

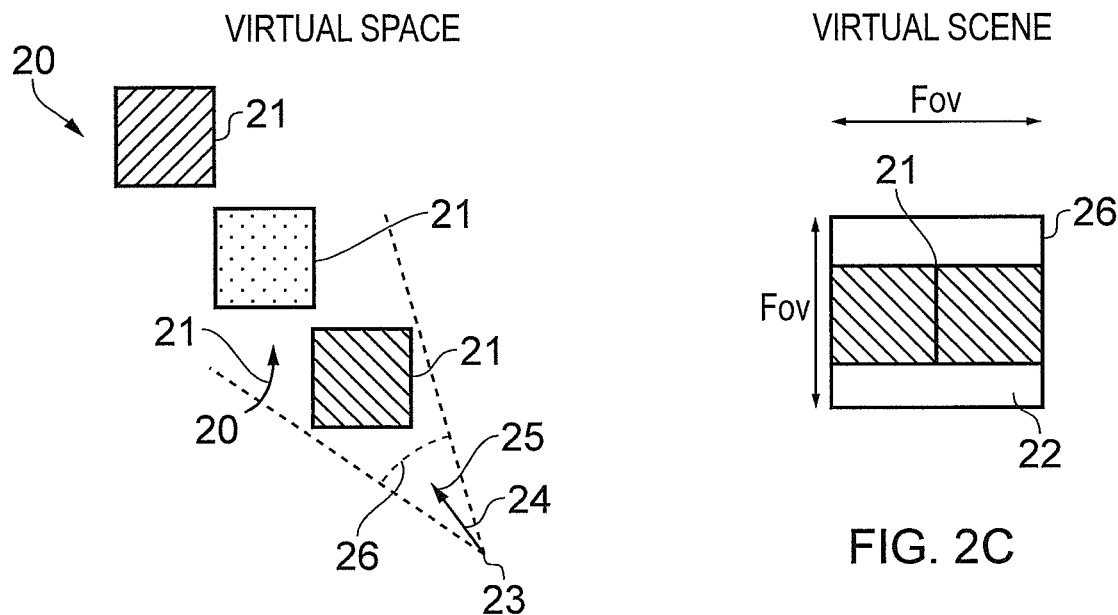
FIG. 1C
FIG. 2C
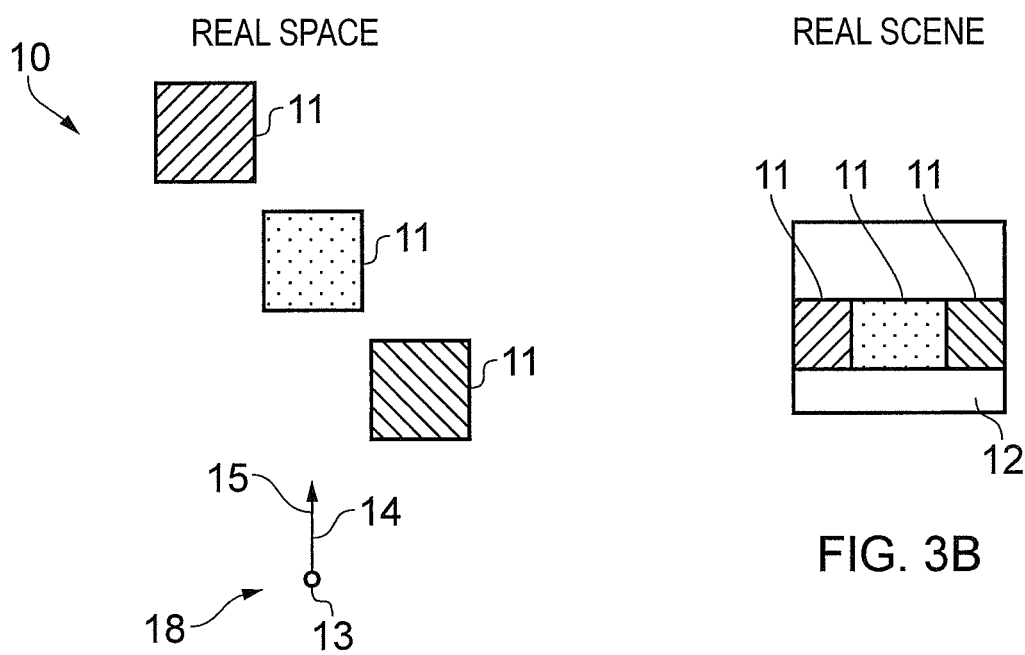
FIG. 3A
FIG. 3B

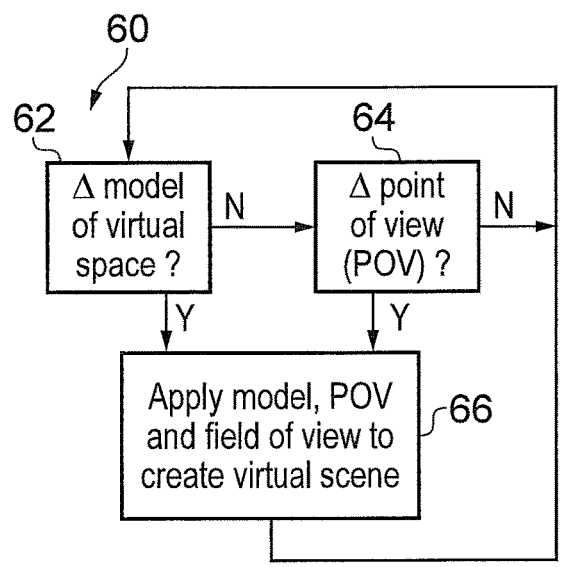
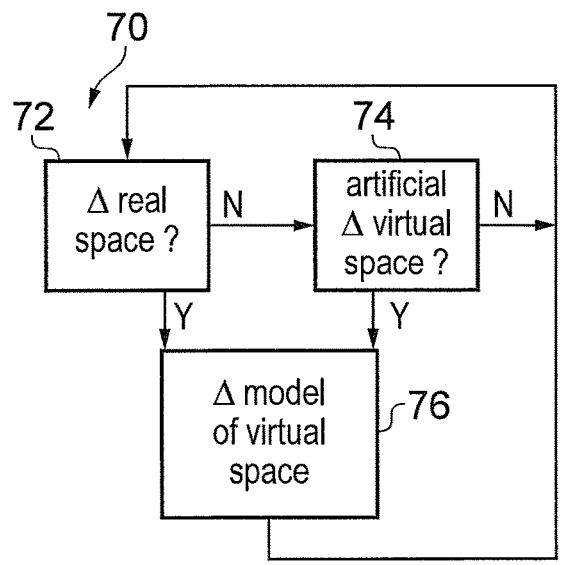
FIG. 5        FIG. 6
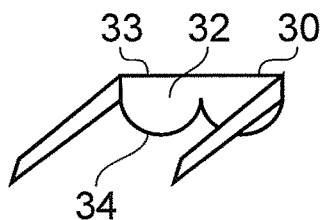
FIG. 7

CONTENT DISCOVERY

RELATED APPLICATION

This application was originally filed as Patent Cooperation Treaty Application No. PCT/FI2017/050584 filed Aug. 22, 2017 which claims priority benefit to EP Patent Application No. 16186034.1, filed Aug. 26, 2016.

TECHNOLOGICAL FIELD

Embodiments of the present invention relate to content discovery. In particular, they relate to content discovery in mediated reality, such as augmented reality or virtual reality.

BACKGROUND

Mediated reality in this document refers to a user experiencing a fully or partially artificial environment.

Augmented reality is a form of mediated reality in which a user experiences a partially artificial, partially real environment. Virtual reality is a form of mediated reality in which a user experiences a fully artificial environment.

In some circumstances, some portions of mediated reality content may be positioned outside a user's field of view. Reliance on serendipitous discovery of those portions of mediated reality content is not ideal.

BRIEF SUMMARY

According to various, but not necessarily all, embodiments of the invention there is provided a method, comprising: causing display of a virtual object at a first position in virtual space, the virtual object having a visual position and an aural position at the first position; processing positional audio data based on the aural position of the virtual object being at the first position; causing positional audio to be output to a user based on the processed positional audio data; changing the aural position of the virtual object from the first position to a second position in the virtual space, while maintaining the visual position of the virtual object at the first position; further processing positional audio data based on the aural position of the virtual object being at the second position; and causing positional audio to be output to the user based on the further processed positional audio data, while maintaining the visual position of the virtual object at the first position.

According to various, but not necessarily all, embodiments of the invention there is provided computer program code that, when performed by at least one processor, causes at least the following to be performed: causing display of a virtual object at a first position in virtual space, the virtual object having a visual position and an aural position at the first position; processing positional audio data based on the aural position of the virtual object being at the first position; causing positional audio to be output to a user based on the processed positional audio data; changing the aural position of the virtual object from the first position to a second position in the virtual space, while maintaining the visual position of the virtual object at the first position; further processing positional audio data based on the aural position of the virtual object being at the second position; and causing positional audio to be output to the user based on the further processed positional audio data, while maintaining the visual position of the virtual object at the first position.

The computer program code may be stored by a non-transitory computer readable medium.

According to various, but not necessarily all, embodiments of the invention there is provided apparatus, comprising: means for causing display of a virtual object at a first position in virtual space, the virtual object having a visual position and an aural position at the first position; means for processing positional audio data based on the aural position of the virtual object being at the first position; means for causing positional audio to be output to a user based on the processed positional audio data; means for changing the aural position of the virtual object from the first position to a second position in the virtual space, while maintaining the visual position of the virtual object at the first position; means for further processing positional audio data based on the aural position of the virtual object being at the second position; and means for causing positional audio to be output to the user based on the further processed positional audio data, while maintaining the visual position of the virtual object at the first position.

According to various, but not necessarily all, embodiments of the invention there is provided apparatus comprising: at least one processor; and memory storing computer program code configured, working with the at least one processor, to cause the apparatus at least to perform: causing display of a virtual object at a first position in virtual space, the virtual object having a visual position and an aural position at the first position; processing positional audio data based on the aural position of the virtual object being at the first position; causing positional audio to be output to a user based on the processed positional audio data; changing the aural position of the virtual object from the first position to a second position in the virtual space, while maintaining the visual position of the virtual object at the first position; further processing positional audio data based on the aural position of the virtual object being at the second position; and causing positional audio to be output to the user based on the further processed positional audio data, while maintaining the visual position of the virtual object at the first position.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual space and different points of view, and FIGS. 2A, 2B, 2C illustrate a virtual scene from the perspective of the respective points of view;

FIG. 3A illustrates an example of a real space and FIG. 3B illustrates an example of a real scene that partially corresponds with the virtual scene of FIG. 1B;

FIG. 5 illustrates an example of a method for enabling mediated reality and/or augmented reality and/or virtual reality;

FIG. 6 illustrates an example of a method for updating a model of the virtual space for augmented reality;

FIG. 7 illustrates an example of apparatus that enables display of at least parts of the virtual scene to a user;

Figure 12:
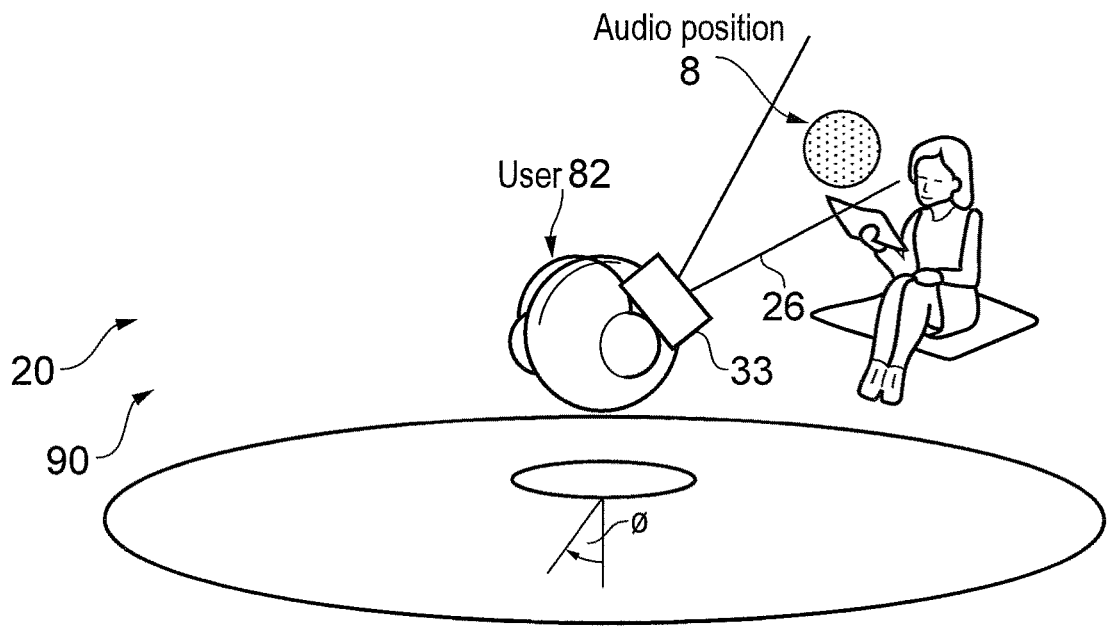
Figure 13:
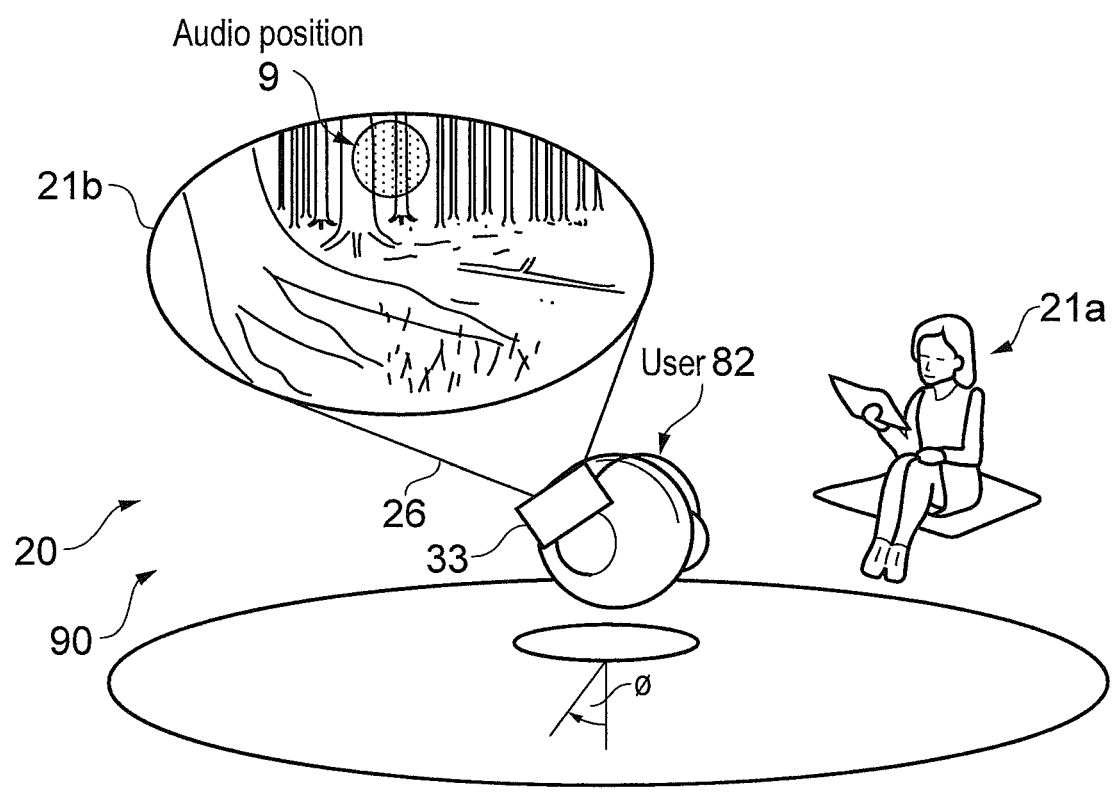

FIG. 12 illustrates the virtual space after the user's gaze has moved from being directed towards the first position to being directed towards the second position; and FIG. 13 illustrates the virtual space after the aural position of the virtual object has moved from the second position to a third position in the virtual space, and after the user's gaze has moved from being directed towards the second position to being directed towards the third position.

DETAILED DESCRIPTION

Embodiments of the invention relate to helping a user to discover content more easily and efficiently. They relate, in particular, to discovery of portions of mediated reality content. In embodiments of the invention, positional audio is output to a user. A virtual object may be displayed at a first position. An aural position of the virtual object, as may be identifiable by a user in the positional audio, is initially also at the first position. The aural position of the virtual object may be moved to a second position while the visual position of the virtual object remains at the first position. This provides an aural prompt for the user to look towards the second position, potentially guiding the user to new portions of content.

Definitions

In this document, the following definitions apply:

"field of view" refers to extent of the observable world that is visible to a user at a particular instance in time;

"virtual space" refers to fully or partially artificial environment, which may be three dimensional;

"virtual scene" refers to a representation of the virtual space viewed from a particular point of view within the virtual space;

"real space" refers to a real environment, which may be three dimensional;

"real scene" refers to a representation of the real space viewed from a particular point of view within the real space;

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user;

"mediated reality content" is content which enables a user to visually experience a fully or partially artificial environment (a virtual space) as a virtual scene. Mediated reality content could include interactive content such as a video game or non-interactive content such as motion video;

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"augmented reality content" is a form of mediated reality content which enables a user to visually experience a partially artificial environment (a virtual space) as a virtual scene. Augmented reality content could include interactive content such as a video game or non-interactive content such as motion video;

"virtual reality" in this document refers to a form of mediated reality in which a user visually experiences a fully artificial environment (a virtual space) as a virtual scene displayed by an apparatus to a user;

"virtual reality content" is a form of mediated reality content which enables a user to visually experience a fully artificial environment (a virtual space) as a virtual scene. Virtual reality content could include interactive content such as a video game or non-interactive content such as motion video;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"user interactive-mediated" as applied to mediated reality, augmented reality or virtual reality means that user actions at least partially determine what happens within the virtual space;

"displaying" means providing in a form that is perceived visually by the user; and "positional audio" is audio that indicates the virtual, aural position(s) of one or more audio sources to a user when it is output to a user; and

DESCRIPTION

FIGS. 1A-10 and 2A-2C illustrate examples of mediated reality. The mediated reality may be augmented reality or virtual reality.

Figure 1A:
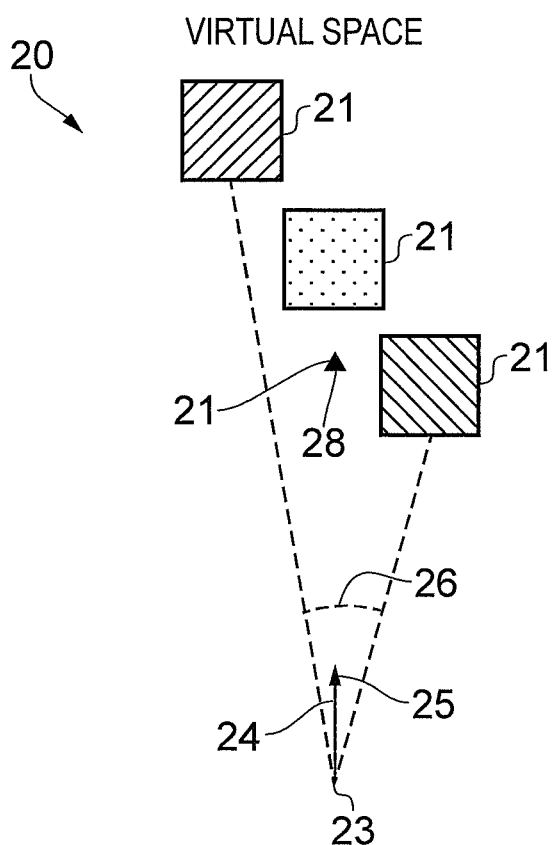
Figure 1B:
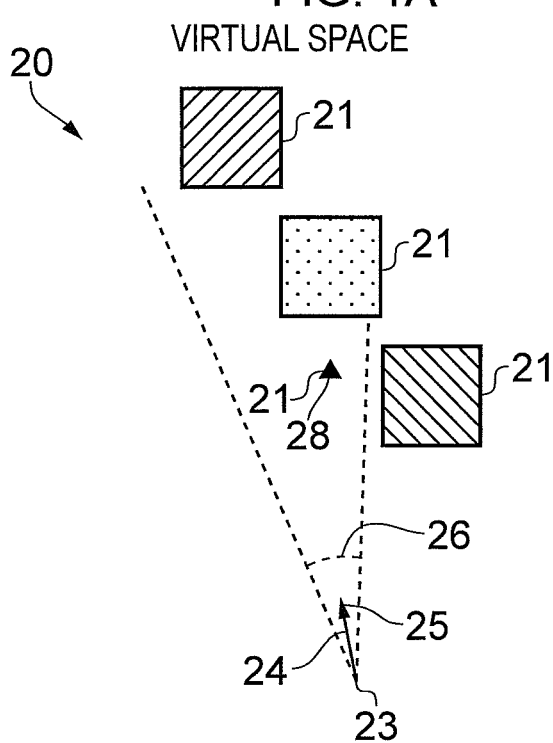

FIGS. 1A, 1B, 1C illustrate the same virtual space 20 comprising the same virtual objects 21, however, each figure illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 10.

Figure 2A:
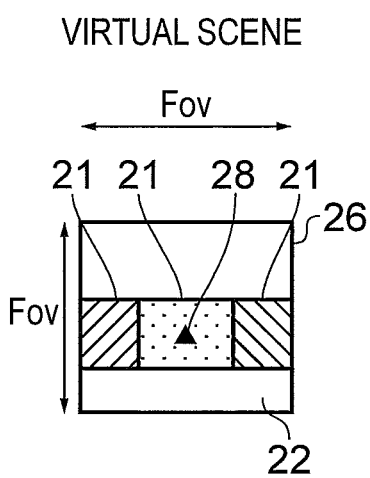
Figure 2B:
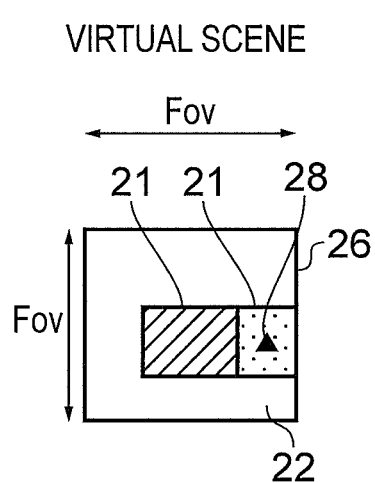

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual space 20.

FIG. 3B illustrates a real scene 12 that partially corresponds with the virtual scene 22 of FIG. 1B, it includes real objects 11 but not artificial virtual objects. The real scene 12 is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 12 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view 24 or on multiple images from different points of view 24 at the same time, processed to generate an image from a single point of view 24.

Figure 4A:
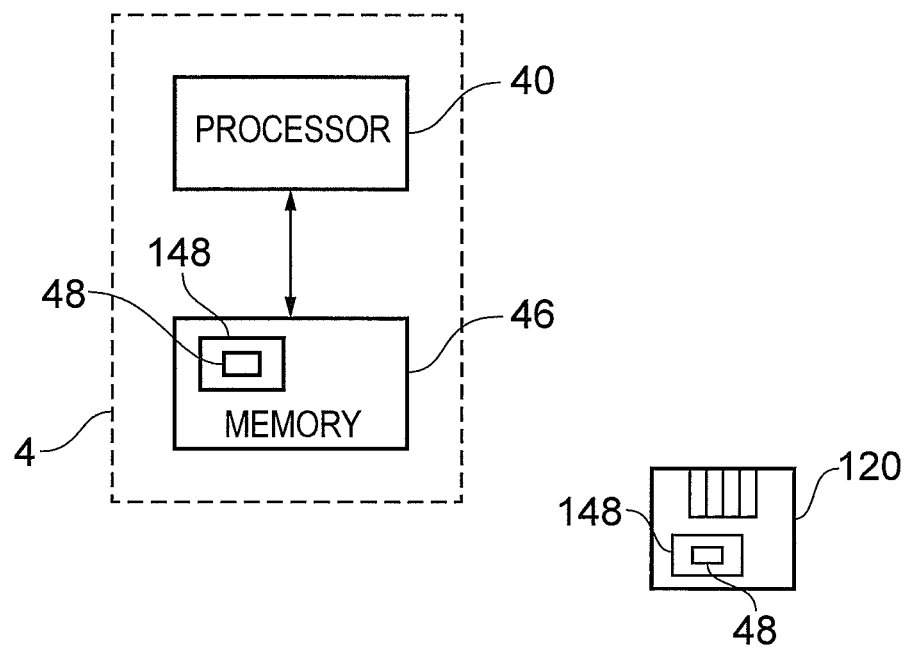
FIG. 4A illustrates a schematic of an apparatus in the form of a chip or chipset.

FIG. 4A illustrates an apparatus 4 in the form of a chip or a chipset. The illustrated apparatus 4 comprises at least one processor 40 and at least one memory 46. The processor(s) 40 might be or include a central processing unit (CPU) and/or a graphics processing unit (GPU). The processor 40 is configured to read from and write to the memory 46. The processor 40 may also comprise an output interface via which data and/or commands are output by the processor 40 and an input interface via which data and/or commands are input to the processor 40.

The memory 46 stores a computer program 148 comprising computer program instructions (computer program code) 48 that controls the operation of the apparatus 4/30 when loaded into the processor 40. The computer program code 48, of the computer program 148, provide the logic and routines that enables the apparatus 4/30 to perform the methods illustrated in FIGS. 5, 6 and 8. The processor 40 by reading the memory 46 is able to load and execute the computer program 148.

The computer program 148 may arrive at the apparatus 4/30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 148. The delivery mechanism may be a signal configured to reliably transfer the computer program 148. The signal could, for example, be sent over a wireless connection (such as a radio frequency connection) or a wired connection in accordance with one or more protocols. The apparatus 4/30 may cause the computer program 148 to be transmitted as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as multiple processors, such as one or more separate components/circuitry some or all of which may be integrated/removable. The processor(s) 40 may be single core or multi-core.

Figure 4B:
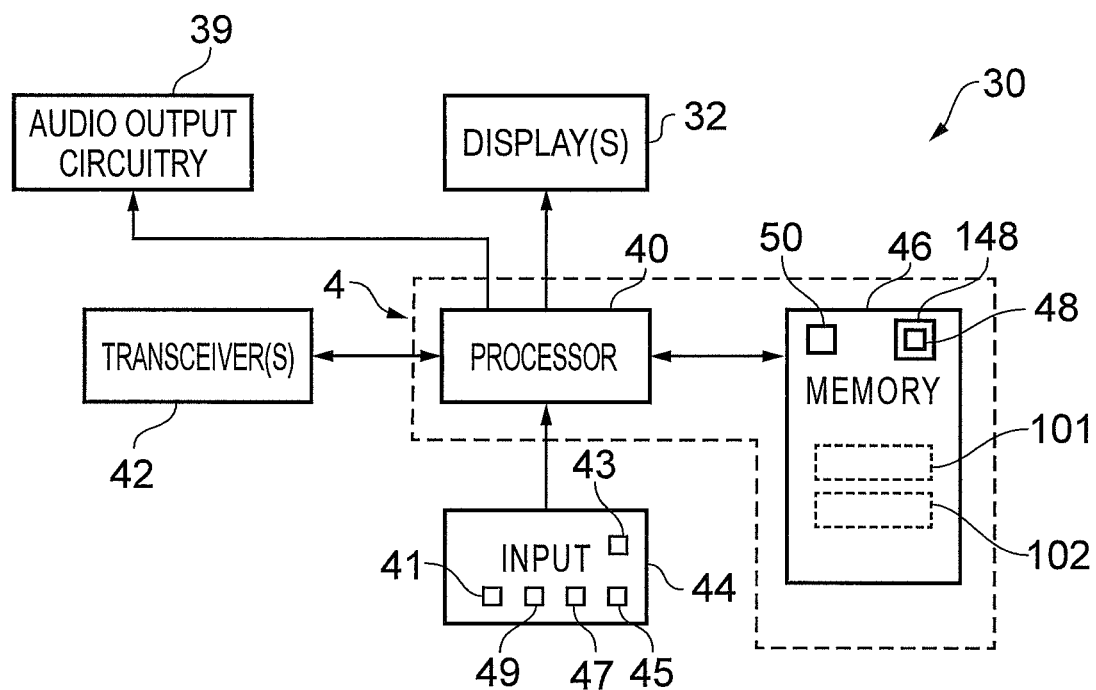
FIG. 4B illustrates an example of an apparatus that is operable to enable mediated reality and/or augmented reality and/or virtual reality.

FIG. 4B illustrates a schematic of an apparatus 30 that is operable to enable mediated reality and/or augmented reality and/or virtual reality.

In some embodiments, the apparatus 30 might be a single electronic device such as a head-mounted device. An example of such a head-mounted device is illustrated in FIG. 7.

In other embodiments, the apparatus 30 could be distributed across multiple devices, which may be formed from a combination of a head-mounted device, a games console/personal computer and/or one or more hand-held controllers. Where the apparatus 30 is formed at least in part by a games console or a personal computer, the processor 40 and the memory 46 (or, where multiple processors and/or multiple memories are provided, one or more of either or both) may be provided in the games console/personal computer.

In the illustrated example, the apparatus 30 comprises the apparatus 4 illustrated in FIG. 4A, one or more displays 32, audio output circuitry 39, one or more transceivers 42 and user input circuitry 44.

In FIG. 4A, the memory 46 is illustrated as storing mediated reality content in the form of visual data 101 and audio data 102. The visual data 101 may be processed by the processor 40 to provide the visual aspect of the mediated reality content to a user and the audio data 102 is processed by the processor 40 to provide the aural aspect of the mediated reality content to a user.

Mediated reality content enables a user to visually experience a fully or partially artificial environment (a virtual space 20) as a virtual scene 22. The mediated reality content might, for example, be interactive content such as a video game or non-interactive content such as motion video.

The mediated reality content may extend around a user and beyond the field of view of the user when it is viewed.

This means that it is not possible for the user to see the whole of the displayed mediated reality content at any one instance in time. The mediated reality content may, for example, extend around 180 degrees or more in one or more dimensions. In some examples, the mediated reality content may extend around 360 degrees in one or more dimensions.

The whole of the mediated reality content need not be displayed at the same time. That is, the angular range over which the mediated reality content may be viewed by the user by moving his head and/or eyes may be greater than the angular range over which the mediated reality content is displayed by the one or more displays at a particular instance in time.

The mediated reality content could be virtual reality content or augmented reality content. Virtual reality content enables a user to experience a fully artificial environment (a virtual space 20) as a virtual scene 22. Augmented reality content enables a user to experience a partially artificial environment as a virtual scene 22 comprising a physical real world environment (real space) supplemented by one or more virtual, visual elements 28 displayed by the display(s) 32 of the apparatus 30.

In this example, the audio data 102 is positional audio data. Positional audio is audio that indicates the virtual, aural position(s) of one or more audio sources, contained in the positional audio data 102, to a user when it is output to a user. That is, the audio is such that a user, upon hearing the audio, is able to associate a particular source in the audio stream with a particular position in virtual space 20. The positional audio data 102 may, for example, define the virtual position and direction of audio from one or more audio sources.

In some examples, the positional audio is binaural audio and the positional audio data 102 is binaural audio data. Binaural audio may be recorded as binaural audio data using two microphones placed either side of a stand or dummy human head, such that the recorded binaural audio data takes account of the manner is in which audio is heard by a person/user (for instance, due to spacing of the ears and the filtering of sounds of the body). However, the use of binaural data is not limited to recordings performed with a dummy head. A monaural (single-channel) sound source can be rendered binaurally such that the sound source is filtered by such head related transfer function (HRTF) filters which models the transfer path from the desired sound source location in the audio scene to the ears of the listener. Typically, a pair of HRTF filters is used, one for the left ear and one for the right ear.

In some examples, the positional audio is loudspeaker format spatial audio. As an example, the known method of Vector Base Amplitude Panning (VBAP) may be used to pan a sound source to a suitable (virtual) position between loudspeakers in a multichannel loudspeaker arrangement, such as 5.1. or 7.1 or the like. For example, using VBAP, the gains of the sound source may calculated such that when the sound source signal is multiplied with these gains and then the signals are played from two loudspeakers, the sound source appears to virtually locate somewhere along a line which connects the loudspeakers. By selecting a suitable pair of loudspeakers, the sound source can be positioned anywhere in a 360 degree radius in a loudspeaker arrangement such as 5.1 and 7.1. In an analogous manner, three dimensional loudspeaker arrangements may be implemented, with the difference that when a three dimensional arrangement is used, the gains are calculated for a loudspeaker triplet rather than a pair.

It is noted that binaural format audio and loudspeaker format audio does not limit the way the audio is captured. Monaural sound sources can be rendered to positional audio using both techniques. A multi-microphone input signal, such as an input signal from a spherical microphone array can be converted to binaural format or loudspeaker format positional audio using parametric spatial audio processing techniques typically comprising steps such as bandwise direction of arrival estimation and diffuseness estimation. The positional audio can also be created using a combination of loudspeaker format spatial audio and binaural format spatial audio. For example, loudspeaker format spatial audio can be binaurally rendered by interpreting the loudspeaker signals as virtual sound sources which are then binaurally rendered from the appropriate spatial locations to enable binaural monitoring of loudspeaker format audio.

The one or more displays 32 are for providing at least parts of the virtual scene 22 to a user in a form that is perceived visually by the user. Such a virtual scene may form part of mediated reality content, such as virtual reality content or augmented reality content. The display(s) 32 may be one or more visual displays that provides light which displays at least parts of the virtual scene 22 to a user. Examples of visual displays include liquid crystal displays, organic light emitting displays, emissive, reflective, transmissive and transflective displays, direct retina projection display, near eye displays etc. The display(s) 32 is controlled in this example but not necessarily all examples by the processor 40.

A head-mounted device moves when the head of the user moves. The head-mounted device may be a see-through arrangement for augmented reality that enables a live real scene 12 to be viewed while one or more visual elements 28 are displayed by the display(s) 32 to the user to provide in combination the virtual scene 22. In this case a visor, if present, is transparent or semi-transparent so that the live real scene 12 can be viewed through the visor.

A head-mounted device may be operated as a see-video arrangement for augmented reality that enables a live video of a real scene 12 to be displayed by the display(s) 32 for viewing by the user while one or more visual elements 28 are simultaneously displayed by the display(s) 32 for viewing by the user. The combination of the displayed real scene 12 and displayed one or more visual elements 28 provides the virtual scene 22 to the user. In this case the visor is opaque and may be used as the display(s) 32.

The audio output circuitry 39 is for outputting audio to a user. The audio output circuitry 39 may, for example, be provided by headphones. Alternatively, the audio output circuitry 39 may be provided by multiple loudspeakers for outputting multi-channel audio.

The one or more transceivers 42 are configured to receive inputs from the processor 40 to provide outputs to the processor 40. For example, the one or more transceivers 42 may receive data from the processor 40 and transmit it, and provide received data to the processor 40.

The one or more transceivers 42 may include one or more wireless transceivers and/or one or more wired transceivers. Such wireless transceivers may, for example, include radio frequency receivers in the form of one or more long range cellular transceivers or short range wireless transceivers (which, for example, may operate in accordance with an Institute of Electrical and Electronic Engineers wireless local area network 802.11 protocol or a Bluetooth protocol). Such wired transceivers may, for example, include a Universal Serial Bus (USB) transceiver.

In the illustrated example, the user input circuitry 44 may comprise one or more tactile sensors 43, one or more point of view sensors 45 one or more image sensors 47 for imaging real space 10 and one or more depth sensors 49.

The one or more tactile sensors 43 may include, for example, one or more joysticks and one or more keys/buttons. The joystick(s) and/or the key(s)/button(s) may form part of a physical, hand-held controller. If the apparatus 30 is head-mounted, at least some of the one or more tactile sensors 43 may be positioned on the head-mounted apparatus.

The apparatus 30 may enable user-interactive mediation for mediated reality and/or augmented reality and/or virtual reality. The user input circuitry 44 detects user actions using user input, such as via the tactile sensor(s) 43. These user actions are used by the processor 40 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the processor 40 to determine the point of view 24 within the virtual space 20, changing the virtual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the processor 40 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or point of view 14 and/or a user moving his/her eyes. A head-mounted apparatus 30 may be used to enable first-person perspective mediation.

The apparatus 30 may comprise as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

A user's gaze in real or virtual space 10, 20 is determined both by the user's point of view 14, 24 and by the direction of the user's eyes. A user's gaze can therefore be changed by the user changing his point of view 14, 24 or by moving his eyes, or both.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infra-red light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

The apparatus 30 may enable mediated reality and/or augmented reality and/or virtual reality, for example using the method 60 illustrated in FIG. 5 or a similar method. The processor 40 stores and maintains a visual and aural model 50 of the virtual space 20 by processing visual data 101 and aural data 102. The model 50 represents mediated reality content 90 that is rendered for provision to a user at a particular instance in time.

The visual aspect of the model 50 may be provided to the processor 40 or determined by the processor 40 operating in accordance with the computer program code 48. For example, sensors in input circuitry 44 may be used to create overlapping depth maps of the virtual space from different points of view and a three dimensional model 50 may then be produced.

The aural aspect of the model 50 may be determined by the processor 40 using an audio renderer that forms part of the computer program code 48. The aural aspect of the model 50 may be provided by positional audio such as binaural audio. The audio renderer may use binaural rendering techniques to render the sound such as by using head related transfer function filtering where the audio output circuitry 39 is provided by headphones and vector-base amplitude panning where the audio output circuitry 39 is provided by loudspeakers.

At block 62 it is determined whether or not the model 50 of the virtual space 20 has changed. If the model 50 of the virtual space 20 has changed the method moves to block 66. If the model 50 of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The positional audio is rendered using the user's position 23 within the virtual space 20 and potentially also the user's point of view 24. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 6 illustrates a method 70 for updating a model 50 of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10. The communication circuitry 41 may form part of the transceiver(s) 42.

FIG. 7 illustrates an example of the apparatus 30 in the form of a head-mounted device 33 comprising a display 32 that displays images to a user. The head-mounted apparatus 33 may be moved automatically when a head of the user moves.

The head-mounted device 33 may be a see-through arrangement for augmented reality that enables a live real scene 12 to be viewed while one or more visual elements 28 are displayed by the display 32 to the user to provide in combination the virtual scene 22. In this case a visor 34, if present, is transparent or semi-transparent so that the live real scene 12 can be viewed through the visor 34.

The head-mounted device 33 may be operated as a see-video arrangement for augmented reality that enables a live video of a real scene 12 to be displayed by the display 32 for viewing by the user while one or more visual elements 28 are simultaneously displayed by the display 32 for viewing by the user. The combination of the displayed real scene 12 and displayed one or more visual elements 28 provides the virtual scene 22 to the user. In this case a visor 34 is opaque and may be used as display 32.

Referring back to FIG. 4B, the apparatus 30 may enable user-interactive mediation for mediated reality and/or augmented reality and/or virtual reality. The user input circuitry 44 detects user actions from user input. These user actions are used by the processor 40 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body.

The tracking of one or more objects and/or points in relation to a user's body may be used by the apparatus 30 in gesture recognition and so on.

Figure 8:
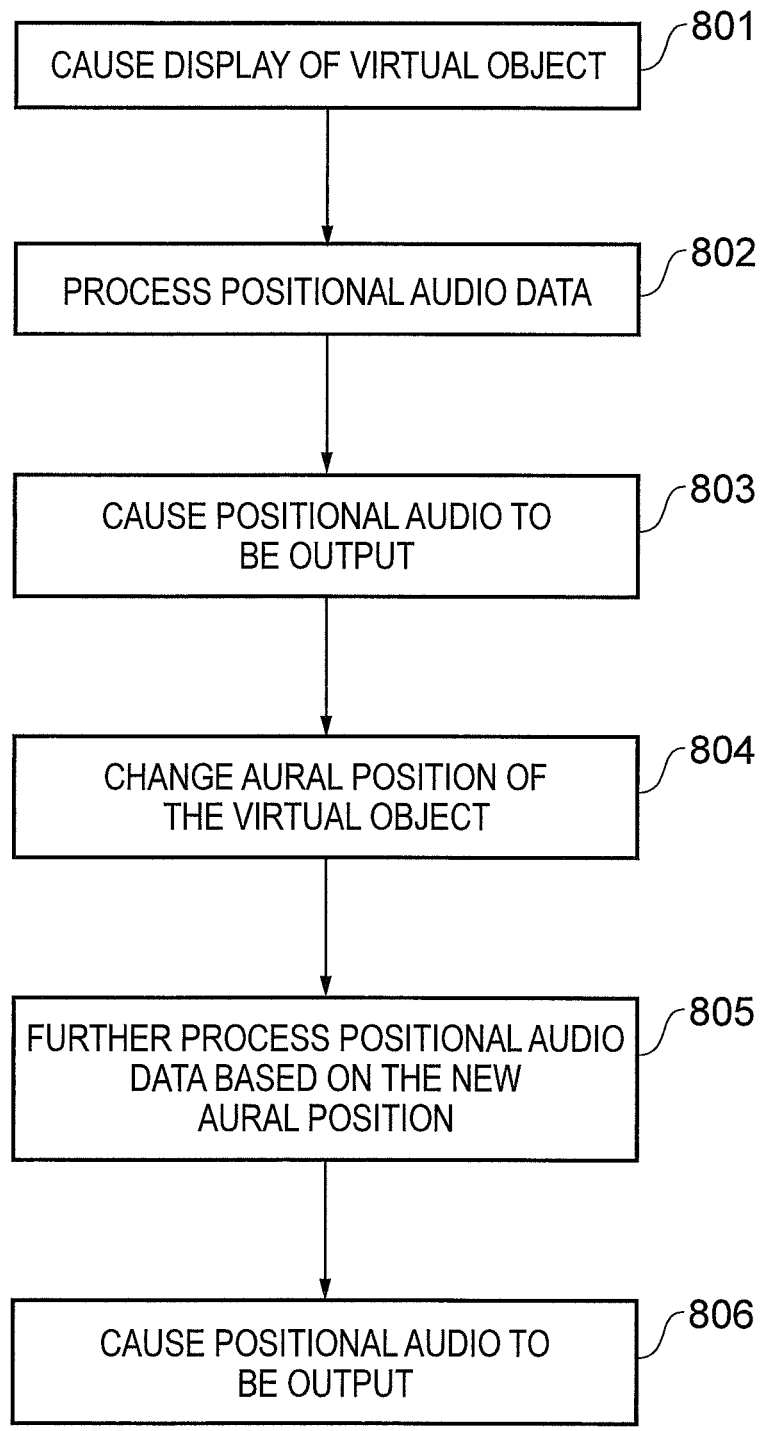
FIG. 8 illustrates a flow chart of a method.

FIG. 8 illustrates a flow chart of a method according to embodiments of the invention. A description of the method follows, with reference to FIGS. 4A to 13.

In the example of the method described below, the apparatus 30 is a head-mounted device 33 that is worn by a user 82 to experience mediated reality content 90. The mediated reality content 90 may, for example, be virtual reality content or augmented reality content. In other examples, the virtual reality content could instead be provided by a plurality of displays positioned around the user 82 rather than a head-mounted device 33.

Audio is output to the user 82 via audio output circuitry 39 provided by headphones in the example below, which might be integrated with the head-mounted device 33, although that need not necessarily be the case. The audio output circuitry 39 could alternatively be provided by multiple loudspeakers. In this example the audio is binaural audio, but it other examples it need not be.

The processor 40 processes the visual data 101 in order to enable the user 82 to experience mediated reality content 90, and continually cycles through the method illustrated in FIG. 5 and, in the case of augmented reality content, FIG. 6.

Figure 9:
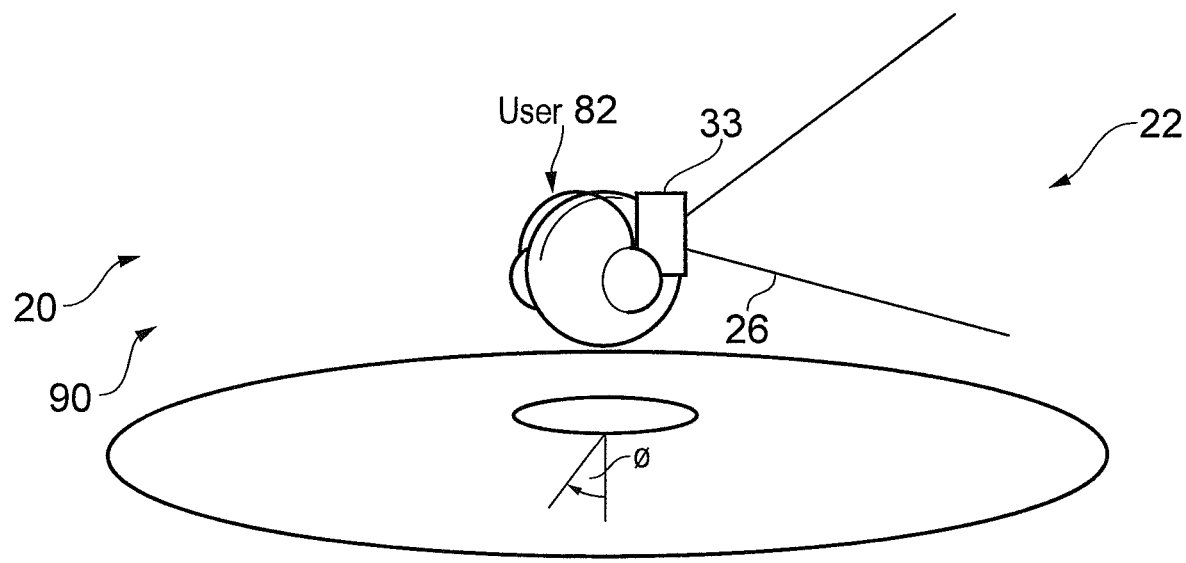
FIG. 9 illustrates a user viewing mediated reality content.

FIG. 9 illustrates a user 82 experiencing mediated reality content 90 via a head-mounted device 33. The user is viewing a virtual scene 22 which is determined by the user's field of view 26 and position in a virtual space 20. The virtual space 20 forms part of mediated reality content 90. In this example, the mediated reality content 90 extends beyond the user's field view of 26 in at least the azimuthal dimension ø. The mediated reality content 90 extends 360° around the user 82 in the azimuthal direction ø in the illustration, but that need not be the case in other examples.

The user's gaze is being (continuously) monitored in the manner described above while the user 82 is experiencing the mediated reality content 90.

Figure 10:
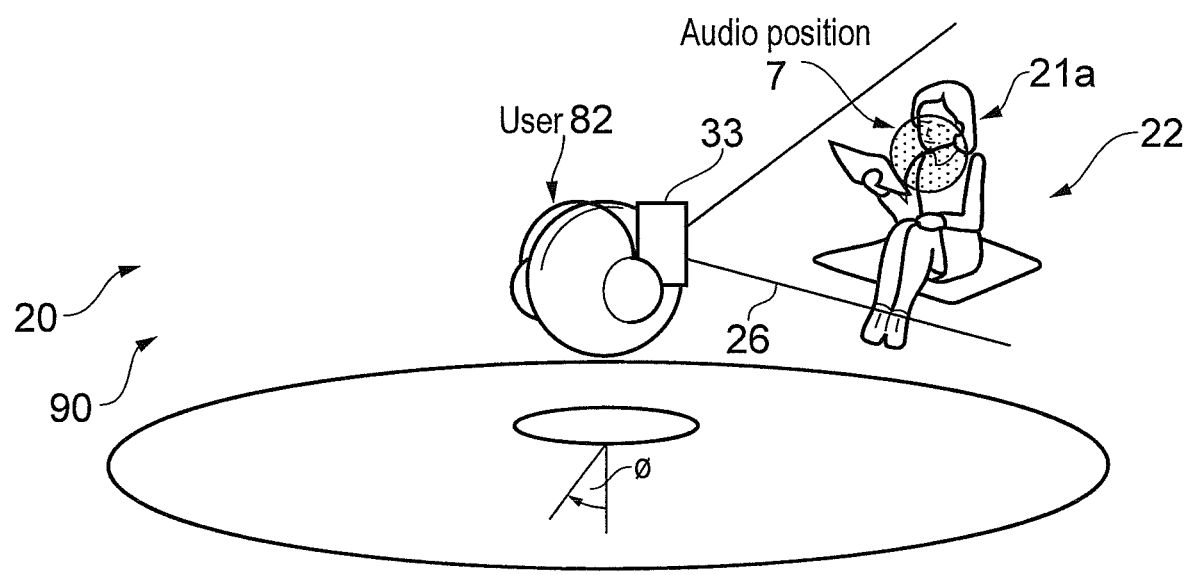
FIG. 10 illustrates a virtual object being displayed at a first position in virtual space, where an aural position of the virtual object is also at the first position.

At block 801 in FIG. 8, the processor 40 causes display of a virtual object 21*a* in the virtual space 20 by the display(s) 32. The virtual object 21*a* is displayed at a first position 7. FIG. 10 illustrates the virtual object 21*a* being displayed at the first position 7 in the virtual space 20. The virtual object 21a is associated with an audio source provided in the positional audio data 102. In this example, the audio source is a narration of a story and the virtual object 21a is the narrator of the story. In other examples, the audio source and the virtual object 21a could be different.

The virtual object 21a is displayed within the virtual scene 22 being viewed by the user 82. In FIG. 10, the virtual object 21a can be considered to have a "visual position" in the virtual space 20 at the first position 7, because that is where it is displayed by the display(s) 32.

The aural position of the virtual object 21a in the virtual space 20, as defined in the positional audio data 102, is also the first position 7. When the audio source and the aural position are processed by the audio renderer in the computer program code 48, the audio output by the audio output circuitry 39 is such that when the user 82 hears the audio, he perceives the audio to be emanating from (the virtual object 21a at) the first position 7.

In block 802 in FIG. 8, the processor 40 processes the positional audio data 102 in the manner explained above. In block 803 in FIG. 8, the processor 40 causes positional audio to be output to the user 82, via the audio output circuitry 39, based on the processed positional audio data 102, in the manner described above.

As mentioned above, the processor 40 continually monitors the user's gaze. At this point in the method, the processor 40 determines that the user's gaze is directed towards the first position 7, while the visual position and the aural position of the virtual object 21a are at the first position 7.

The processor 40 then receives a trigger that may be stored as part of the visual data 101 which, for example, indicates that there is a portion of the content that the user's attention/gaze should be drawn to. In the context of this example, the virtual object 21a that is narrating the story may be narrating about a particular portion of the mediated reality content 90 that is displayed at a position in the virtual space 20 which is outside the user's current field of view 26.

Figure 11:
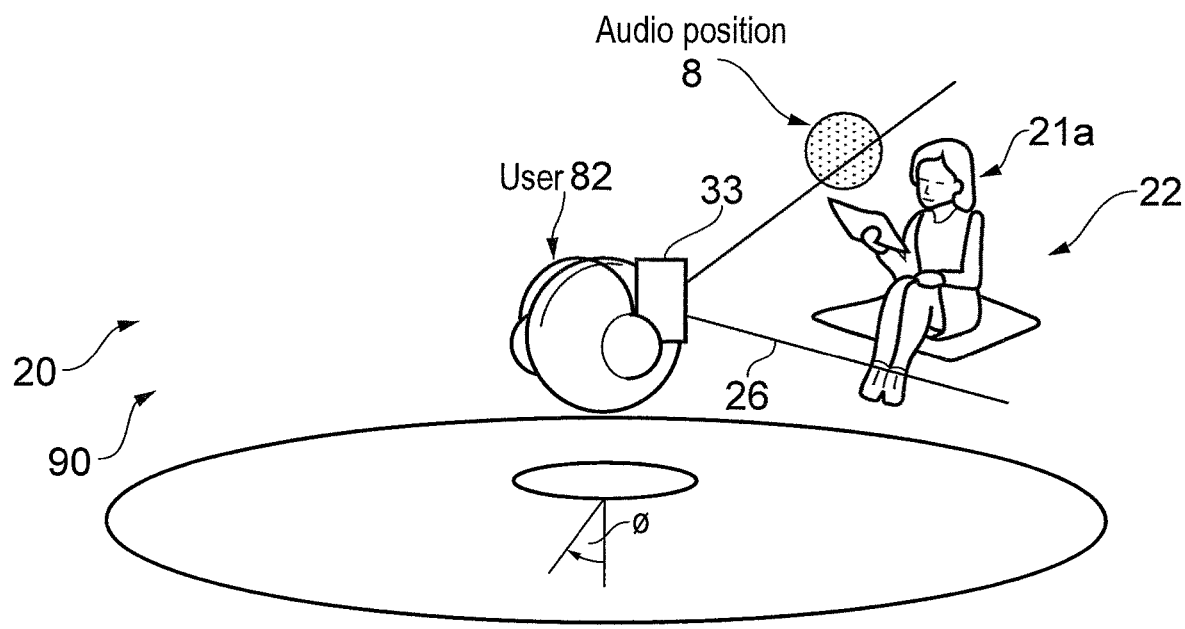
FIG. 11 illustrates the virtual space after the aural position of the virtual object has moved from the first position to a second position in the virtual space.

In response to receiving the trigger, in block 804 in FIG. 8, the processor 40 changes the aural position of the virtual object 21a to a second position 8 in the virtual space 20, while maintaining the visual position of the virtual object 21a at the first position 7 unchanged. This is illustrated in FIG. 11. In this example, no visual indication is provided to the user that the aural position of the virtual object 21a has been moved from the first position 7 to the second position 8.

In some embodiments, the initial change in the aural position from the first position 7 to the second position 8 might be small. For instance, the second position 8 might be located within the field of view 26 that the user 82 has while he is viewing the virtual object 21a prior to movement of the aural position.

In this example, the change in the aural position of the virtual object 21a is achieved by changing/updating the aural position of the audio source associated with the virtual object 21a that is defined in positional audio data 102. The updated aural position is provided to the audio renderer in the computer program code 48 for further processing. This is illustrated in block 805 in FIG. 8, in which the processor 40 further processes the positional audio data 102 based on the aural position of the virtual object 21a being at the second position 8. In block 805 in FIG. 8, the processor 40 causes positional audio to be output to the user 82 (via the audio output circuitry 39) based on the further processed audio data, while maintaining the visual position of the virtual object 21a at the first position 7 unchanged. This means that the user 82 perceives the audio source associated with the virtual object 21a to be emanating from the second position 8 rather than the first position 7.

The change in the aural position of the virtual object 21a to the second position 8 acts as an audible prompt to the user 82 to look towards the second position 8. The processor 40 is continually monitoring the direction of the user's gaze. If the processor 40 determines that the user 82 has maintained the direction of his gaze after the change in the aural position of the virtual object 21a, by continuing to direct his gaze towards the virtual object 21a at the first position 7, the processor 40 may then cause the aural position of the virtual object 21a to revert back to the first position 7. This may be done, for instance, if the user's gaze remains unchanged for a predetermined time after changing the aural position of the virtual object 21a to the second position 8.

FIG. 12 illustrates a situation where the user 82 has directed his gaze away from the first position 7, towards the second position 8, by moving his head and/or his eyes. In this example, when the processor 40 determines this, the processor 40 changes the aural position to a third position 9 in the virtual space 20, different from both the first position 7 and the second position 8. The processor 40 may, for instance, change the aural position of the virtual object 21a from the second position 8 to the third position 9 after determining that the user's gaze has been directed towards the second position 8 for a predetermined period of time, while the aural position of the virtual object 21a is at the second position 8.

FIG. 13 illustrates a situation where the user 82 has directed his gaze away from the second position 8 and towards the third position 9 by moving his head and/or his eyes. Virtual content, such as one or more other virtual objects 21b, is positioned at the third position 9 such that it has its visual and aural position at the third position 9. In this example, the third position 9 is located outside the field of view 26 that the user 82 had while he was viewing the virtual object 21a prior to movement of the aural position from the first position 7 to the second position 8.

The user 82 then continues to direct his gaze at the third position 9. While doing so, audio may be provided to the user 82 (via the audio output circuitry 39) from one or more audio sources having an aural position at the third position 9, including the audio source associated with the virtual object 21a.

The processor 40 continues to monitor the user's gaze. If the user's gaze remains directed towards the third position 9, the processor 40 may maintain the aural position of the virtual object 21a at the third position 9 while the user's gaze remains directed towards the other virtual object 21b at the third position 9. Alternatively, the processor 40 may revert the aural position of the virtual object 21a back to (or towards) the first position 7 (where the virtual object 21a is displayed) while the user's gaze remains directed towards the other virtual object 21b at the third position 9.

If the processor 40 instead determines that the user's gaze has been directed away from the other virtual object 21b at the third position 9 (for instance, for longer than a predetermined time), the processor 40 may revert the aural position of the virtual object 21a back to (or towards) the first position 7 (where the virtual object 21a is displayed). Alternatively, the aural position of the virtual object 21a may track the user's gaze away from the third position 9. The processor 40 may cause the other virtual object 21b to be removed from display if it determines that the user's gaze has been directed away from that virtual object 21b (for instance, for longer than a predetermined time).

It could be that after the aural position of the virtual object 21a has been moved to the third position 9, the processor 40 reverts the aural position of the virtual object 21a back to (or towards) the first position 7 (where the virtual object 21a is displayed) automatically irrespective of the direction of the user's gaze. This may involves reverting the aural position of the virtual object 21a directly back to the first position 7 at which the virtual object 21a is displayed, or moving the aural position of the virtual object 21a along a path to the first position 7.

In the embodiments of the invention described above, a change in the aural position of (audio associated with) the virtual object 21a acts as a guide which can guide the user 82 to portions of the mediated reality content 90 that might not have been experienced by the user 82 if they were not discovered serendipitously. This guiding is achieved without a need for a visual guide such as graphics or text, which could obscure some of the content 90 and/or reduce the quality of the user's experience.

In the method described above, the second position 8 to which the aural position of the virtual object 21a is initially re-positioned in block 804 in FIG. 8 is not the final destination to which the user's attention is being guided. The user 82 is being guided along a path in the virtual space 20, from the first position 7 at which the virtual object 21a is displayed to the third position 9, which represents the final destination. In some implementations, the aural position of the virtual object 21a may be moved gradually across the virtual space 20 along a path, through a series of positions intermediate the first position 7 and the third position 9 (the second position 8 being just one of those positions). It may be that if the user's gaze tracks the movement of the aural position of the virtual object 21a along the path from the first position 7 to the final destination/third position 9 (for example, for a predetermined period of time), the processor 40 continues to move the aural position of the virtual object 21a towards the third position 9, but, if the user's gaze does not track (or ceases to track) the movement of the aural position of the virtual object 21a, the processor 40 causes the aural position of the virtual object 21a to return to the first position 7 at which the virtual object 21a is displayed or instead causes it to track the user's gaze.

In other implementations, the second position 8 might represent the final destination to which the user 82 is being guided instead of the third position 9. There may simply be one movement of the aural position of the virtual object 21a from the first position 7 to the second position 8.

In some embodiments, the trigger may define a start time, an end time and a position for the portion of the content 90 that the user's attention/gaze should be drawn to (in the above example, this is the third position 9). In such embodiments, if the processor 40 determines that the user's gaze is directed away from the third position 9 prior to the end time, the processor 40 changes the aural position of the virtual object 21a such that it moves with the user's gaze.

After the end time, the processor 40 might cause the aural position of the virtual object 21a to move back to the first position 7 irrespective of the direction of the user's gaze.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in FIGS. 5, 6 & 8 may represent steps in a method and/or sections of code in the computer program 48. The apparatus 4 provides means for performing the methods illustrated in FIGS. 5, 6 & 8 and described above. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 may, for example be a module. The apparatus 30 may be a module. The user input circuitry 44 may be a module or comprise modules. The one or more displays 32 may be one or more modules.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:
1. An apparatus comprising:
at least one processor; and
at least one memory including computer program code,
the at least one memory and the computer program code configured to, with the at least one processor, cause the apparatus to perform at least the following:
display of a virtual object at a first position in virtual space, the virtual object having a visual position and an aural position at the first position;

process positional audio data based on the aural position of the virtual object being at the first position;

cause positional audio to be output to a user based on the processed positional audio data;

change the aural position of the virtual object from the first position to a second position in the virtual space, the second position identified from the positional audio data, independently of a user input, while maintaining the visual position of the virtual object at the first position;

further process positional audio data based on the aural position of the virtual object being at the second position; and cause positional audio to be output to the user based on the further processed positional audio data, while maintaining the visual position of the virtual object at the first position.

2. The apparatus of claim 1, wherein the at least one memory and the computer program code are further configured to, with the at least one processor, further cause the apparatus to perform at least the following:

determine that the user's gaze is directed towards the first position in the virtual space when the visual position of the virtual object is at the first position and the aural position of the virtual object is at the first position;

monitor the user's gaze to determine whether the user's gaze is directed away from the first position after the aural position of the virtual object is moved to the second position;

in an instance it is determined that the user's gaze has not been directed away from the first position after the aural position of the virtual object has been moved to the second position, change the aural position of the virtual object from the second position to the first position; and in an instance it is determined that the user's gaze has been directed away from the first position after the aural position of the virtual object has been moved to the second position, change the aural position of the virtual object from the second position to a third position in the virtual space.

3. The apparatus of claim 2, wherein the at least one memory and the computer program code are further configured to, with the at least one processor, further cause the apparatus to perform at least the following:

in the instance it is determined that the user's gaze has been directed away from the first position after the aural position of the virtual object has been moved to the second position, and the aural position of the virtual object is changed from the second position to the third position in the virtual space, determine that the user's gaze has been directed towards the second position for a predetermined period of time, wherein the aural position of the virtual object is changed from the second position to the third position after determining that the user's gaze has been directed towards the second position for the predetermined period of time.

4. The apparatus of claim 2, wherein the at least one memory and the computer program code are further configured to, with the at least one processor, further cause the apparatus to perform at least the following:

in the instance it is determined that the user's gaze has been directed away from the first position after the aural position of the virtual object has been moved to the second position, and the aural position of the virtual object is changed from the second position to the third position in the virtual space, cause display of virtual content, different from the virtual object, which has a visual position and an aural position at the third position.

5. The apparatus of claim 2, wherein the at least one memory and the computer program code are further configured to, with the at least one processor, further cause the apparatus to perform at least the following:

in the instance it is determined that the user's gaze has been directed away from the first position after the aural position of the virtual object has been moved to the second position, and the aural position of the virtual object is changed from the second position to the third position in the virtual space, continue to monitor the user's gaze while the aural position of the virtual object is at the third position;

determine that the user's gaze has been directed away from the third position; and change the aural position of the virtual object from the third position to or towards the first position after determining that the user's gaze has been directed away from the third position.

6. The apparatus of claim 5, wherein the at least one memory and the computer program code are further configured to, with the at least one processor, further cause the apparatus to perform at least the following:

in the instance it is determined that the user's gaze has been directed away from the first position after the aural position of the virtual object has been moved to the second position, and the aural position of the virtual object is changed from the second position to the third position in the virtual space, change the aural position of the virtual object from the third position to or towards the first position in the virtual space; and determine that the user's gaze has been directed away from the third position in the virtual space for longer than a predetermined period of time, wherein the aural position of the virtual object is changed from the third position to or towards the first position in the virtual space after determining that the user's gaze has been directed away from the third position in the virtual space for longer than a predetermined period of time.

7. The apparatus of claim 5, further cause the apparatus to perform at least the following: cause the aural position of the virtual object to follow movement of the user's gaze.

8. The apparatus of claim 2, wherein after a predetermined period of time, the aural position of the virtual object is changed from the third position to or towards the first position in the virtual space.

9. A method, comprising:

causing display of a virtual object at a first position in virtual space, the virtual object having a visual position and an aural position at the first position;

processing positional audio data based on the aural position of the virtual object being at the first position;

causing positional audio to be output to a user based on the processed positional audio data;

changing the aural position of the virtual object from the first position to a second position in the virtual space, the second position identified from the positional audio data, independently of a user input, while maintaining the visual position of the virtual object at the first position;

further processing positional audio data based on the aural position of the virtual object being at the second position; and causing positional audio to be output to the user based on the further processed positional audio data, while maintaining the visual position of the virtual object at the first position.

10. The method of claim 9, further comprising:
determining that the user's gaze is directed towards the first position in the virtual space when the visual position of the virtual object is at the first position and the aural position of the virtual object is at the first position; and monitoring the user's gaze to determine whether the user's gaze is directed away from the first position after the aural position of the virtual object is moved to the second position;
in an instance it is determined that the user's gaze has not been directed away from the first position after the aural position of the virtual object has been moved to the second position, changing the aural position of the virtual object from the second position to the first position; and
in an instance it is determined that the user's gaze has been directed away from the first position after the aural position of the virtual object has been moved to the second position, changing the aural position of the virtual object from the second position to a third position in the virtual space.

11. The method of claim 10, further comprising:
in the instance it is determined that the user's gaze has been directed away from the first position after the aural position of the virtual object has been moved to the second position, and the aural position of the virtual object is changed from the second position to the third position in the virtual space, determining that the user's gaze has been directed towards the second position for a predetermined period of time, wherein the aural position of the virtual object is changed from the second position to the third position after determining that the user's gaze has been directed towards the second position for a predetermined period of time.

12. The method of claim 10, further comprising:
in the instance it is determined that the user's gaze has been directed away from the first position after the aural position of the virtual object has been moved to the second position, and the aural position of the virtual object is changed from the second position to the third position in the virtual space, causing display of virtual content, different from the virtual object, which has a visual position and an aural position at the third position.

13. The method of claim 10, further comprising:
in the instance it is determined that the user's gaze has been directed away from the first position after the aural position of the virtual object has been moved to the second position, and the aural position of the virtual object is changed from the second position to the third position in the virtual space, continuing to monitor the user's gaze while the aural position of the virtual object is at the third position; and after determining that the user's gaze has been directed away from the third position, changing the aural position of the virtual object from the third position to or towards the first position.

14. The method of claim 13 further comprising:
in the instance it is determined that the user's gaze has been directed away from the first position after the aural position of the virtual object has been moved to the second position, and the aural position of the virtual object is changed from the second position to the third position in the virtual space, changing the aural position of the virtual object from the third position to or towards the first position in the virtual space; and
determining that the user's gaze has been directed away from the third position in the virtual space for longer than a predetermined period of time, wherein the aural position of the virtual object is changed from the third position to or towards the first position in the virtual space after determining that the user's gaze has been directed away from the third position in the virtual space for longer than a predetermined period of time.

15. The method of claim 13, wherein the aural position of the virtual object follows movement of the user's gaze.

16. A non-transitory computer readable medium comprising program instructions stored thereon for performing at least the following:
causing display of a virtual object at a first position in virtual space, the virtual object having a visual position and an aural position at the first position;
processing positional audio data based on the aural position of the virtual object being at the first position;
causing positional audio to be output to a user based on the processed positional audio data;
changing the aural position of the virtual object from the first position to a second position in the virtual space, the second position identified from the positional audio data, independently of a user input, while maintaining the visual position of the virtual object at the first position;
further processing positional audio data based on the aural position of the virtual object being at the second position; and
causing positional audio to be output to the user based on the further processed positional audio data, while maintaining the visual position of the virtual object at the first position.

* * * * *